United States Patent

Richards

[11] Patent Number: 5,859,887
[45] Date of Patent: Jan. 12, 1999

[54] NUCLEAR FUEL ASSEMBLY SUPPORT GRID

[75] Inventor: James B. Richards, Columbia, S.C.

[73] Assignee: Westinghouse Electric Company, Pittsburgh, Pa.

[21] Appl. No.: 879,538

[22] Filed: Jun. 20, 1997

[51] Int. Cl.[6] .................................................. G21C 3/34
[52] U.S. Cl. ........................................................ 376/438
[58] Field of Search ................................... 376/261, 438, 376/441, 442, 448, 462

[56] References Cited

U.S. PATENT DOCUMENTS

| | | | |
|---|---|---|---|
| 4,389,369 | 6/1983 | Bryan | 376/442 |
| 4,492,844 | 1/1985 | Kobuck et al. | 376/438 |
| 4,579,711 | 4/1986 | Mishima et al. | 376/438 |
| 4,873,051 | 10/1989 | Duncan et al. | 376/438 |
| 5,032,351 | 7/1991 | Johansson | 376/438 |
| 5,221,515 | 6/1993 | Thiebaut et al. | 376/261 |
| 5,259,009 | 11/1993 | Patterson, et al. | 376/439 |
| 5,307,392 | 4/1994 | Bryan | 376/442 |
| 5,406,599 | 4/1995 | Johnson, Jr., et al. | 376/260 |

*Primary Examiner*—Daniel D. Wasil

[57] ABSTRACT

A nuclear fuel assembly support grid formed from a lattice structure having an egg-crate design with the interior lattice straps joined to a perimeter strap generally at least three locations along its length; with at least two of those locations being affixed by shear joints. The shear joints are formed from weld tabs extending from the ends of the interior lattice straps, at appropriate locations, which fit into corresponding slots in the perimeter strap. The weld tabs are then brazed or welded, as appropriate to the base metals being joined, after being inserted. The weld segments can be designed with twist tabs at their end, that can be deformed after being inserted into the corresponding slots in the peripheral strap, to hold the fixture in place while it is being bonded. In another embodiment, the interior lattice straps are joined to the perimeter strap by two shear joints formed respectively at the very top and bottom of the interface.

12 Claims, 4 Drawing Sheets

NUCLEAR FUEL ASSEMBLY SUPPORT GRID

BACKGROUND OF THE INVENTION

1. Field of the Invention

This invention relates generally to nuclear reactor fuel element support grids and more particularly to support grids formed from lattice straps which are metallurgically bonded to a perimeter strap.

2. Background Information

Nuclear fuel assembly grids are used to precisely maintain the spacing between fuel rods in a nuclear reactor core, prevent rod vibration, and provide lateral support for the fuel rods. Grids are made of materials with low neutron absorption cross-sections such as stainless steel, inconel, and alloys of zirconium to minimize grid deformation and the loss of structural integrity during irradiation. Conventional designs of grids for nuclear reactor fuel assemblies include a multiplicity of interleaved inner grid straps formed in an egg-crate configuration defining cells which accept fuel rods. The ends of each of the inner grid straps are interlocked with an outer grid strap, forming the peripheral cells of the grid. Each cell provides support to one fuel rod at a given axial location through the use of relatively resilient springs of various forms. In order to minimize the lateral displacement of fuel rods and to improve the fuel characteristics of an assembly, a number of grids are spaced along the fuel assembly length. In pressurized water reactors, typically each grid is held in place along the fuel assembly by attachment to control rod guide thimbles. In boiling water reactors, typically a can surrounds the fuel rods and grids. In the boiling water reactor, each grid is held in place along the fuel assembly length by a special locking rod.

The interior straps that are interlocked in an egg-crate pattern are generally held in place by a welded or brazed joint at their intersecting locations. The ends of the lattice straps are similarly affixed to a perimeter strap that surrounds them by welds or brazes. If the straps are made of Zircalloy or stainless steel, they can generally be welded. If inconel or nickel-plated inconel are employed, they generally have to be brazed.

Designers are constantly seeking to improve the means of manufacture of the grids. Areas of interest include mechanisms for reducing the manufacturing effort, and meeting the stringent design envelope, or tolerances, on dimensional parameters of the grid. Further considerations include retaining the structural rigidity of the grid, and reducing the amount of material in the grid for minimizing neutron absorption and coolant flow interference by the grid. More particularly, a need specifically exists for an improved means for connecting the outer grid strap to the interior straps.

The peripheral straps are typically provided with anti-snag tabs that protrude from the top and bottom of the strap at spaced locations and angle slightly towards the interior of the grid. The anti-snag tabs prevent the grids from hanging up on adjacent fuel assemblies as they are loaded or unloaded into or out of the core of the reactor. It has been found that the rubbing or bumping of the grids at the anti-snag locations has placed increased strain on the metallurgical joints that bond the interior grid straps to the peripheral strap. This has proved to be a particular problem in brazed joints causing some of them to fail. Accordingly, a further need exists for an improved means for connecting the outer grid strap to the interior straps.

SUMMARY OF THE INVENTION

This invention increases the strength and rigidity of nuclear reactor fuel support grids that employ grid matrices formed from intersecting lattice straps that are surrounded and supported by a peripheral strap. The improvement is achieved in one embodiment by attaching the peripheral strap to the mating lattice straps at their intersection at least three locations along their height, two of which are formed from shear joints. In a preferred arrangement, the peripheral strap is attached to the inner straps at upper, lower and middle locations along the width of the straps with the shear joints formed at least at the upper and lower locations. In another preferred arrangement the shear joints are formed at the very top and bottom of the straps at the mating intersects with the peripheral strap, with or without a joint formed at the middle location.

These and other objects, features and advantages of the present invention will become apparent to those skilled in the art upon reading of the following description when taken in conjunction with the drawings wherein there is shown and described illustrative embodiments of the invention.

BRIEF DESCRIPTION OF THE DRAWINGS

While the specification concludes with claims specifically pointing out and distinctly claiming the subject matter of the invention, it is believed the invention will be better understood from the following description, taken in conjunction with the accompanying drawings wherein:

DESCRIPTION OF THE PREFERRED EMBODIMENT

In a typical nuclear reactor heat is generated within the core of the reactor vessel as a result of nuclear fission. The heat is employed to generate steam, which in turn drives turbine-generators to produce electricity. In a pressurized water nuclear reactor the heat in the core is transferred to a coolant moderator, commonly water, which is transported under pressure to a steam generator that places the coolant in heat transfer relationship with a secondary fluid. The secondary fluid is vaporized into steam which is used to drive the turbine-generators.

Figure 1:
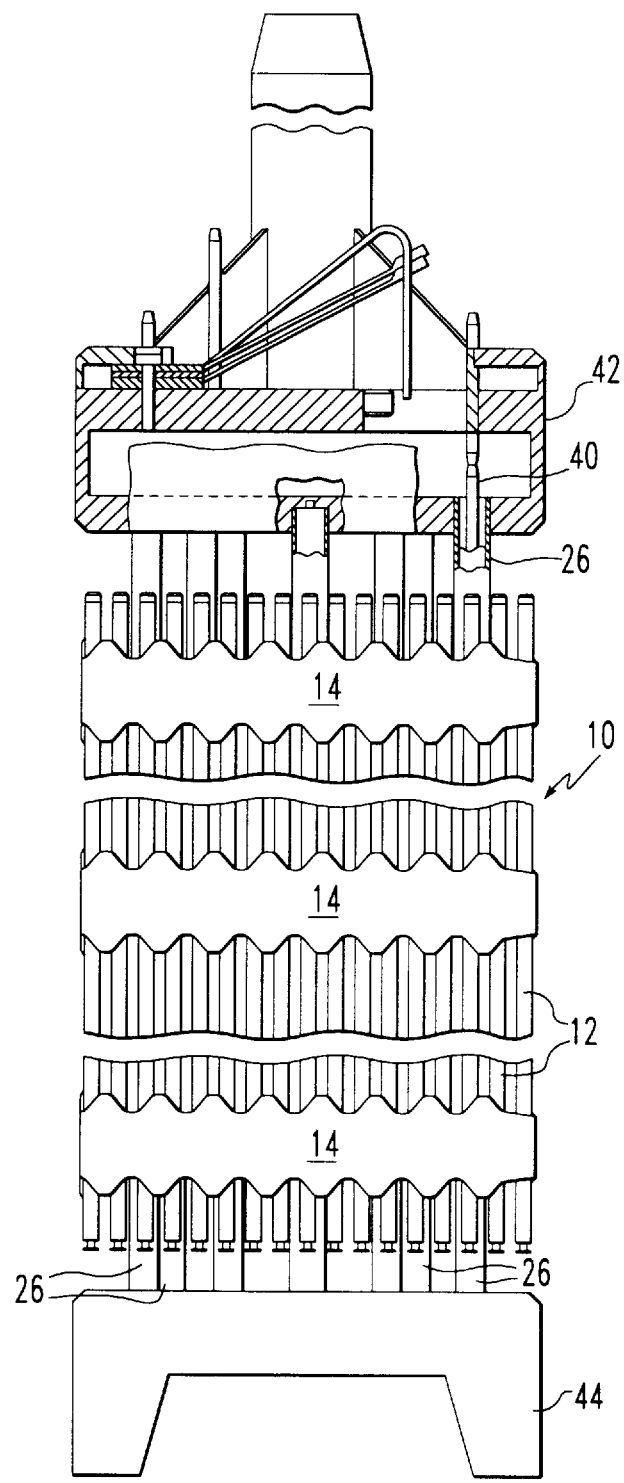
FIG. 1 is a elevational view, partly in section, of a fuel assembly illustrating the relationship of the grids of the invention to other components in the assembly.

The nuclear fuel within the core is typically encapsulated in cylindrical, elongated rods of approximately 0.5 inches in diameter, often referred to as fuel elements. The fuel elements 12 as shown in FIG. 1 are maintained in a polygonal array and, in one preferred embodiment, extend in a longitudinal direction to a length of approximately fourteen feet. The array 10 is generally referred to as a fuel assembly and is bounded by an upper and lower nozzle, respectively identified by reference characters 42 and 44, and maintained in position and appropriately spaced by fuel element support grids 14 that are secured at spaced locations along the longitudinal length of the assembly.

Interspersed among the fuel elements within the assembly are control rod guide tubes and instrumentation tubes 26 that are symmetrically arranged in place of fuel element locations and are used to guide the control rods and act as conduits for in-core instrumentation. The control rods 40 are used to control the process by absorbing neutrons in the core that would otherwise react with the nuclear fuel. The control rods are movable into and out of the core through the guide tubes to control the level of reactivity.

The coolant within the core that flows from a region below the fuel, up through each fuel assembly 10 and out its nozzle 42, includes a moderator such as water that slows the speed of the neutrons to increase the efficiency of the fission process. When the control rods 40 are removed from the core the corresponding thimble tubes 26, that they travel within, are filled with the coolant moderator which increases the fission reactions in the fuel in the cells surrounding the guide tubes 26. A more detailed understanding of the operation of a pressurized water nuclear reactor can be had by referring to U.S. Pat. No. 5,303,276 issued Apr. 12, 1994, entitled "FUEL ASSEMBLY INCLUDING DEFLECTIVE VANES FOR DEFLECTING A COMPONENT OF THE FLUID STREAM FLOWING PAST SUCH A FUEL ASSEMBLY."

Figure 2:
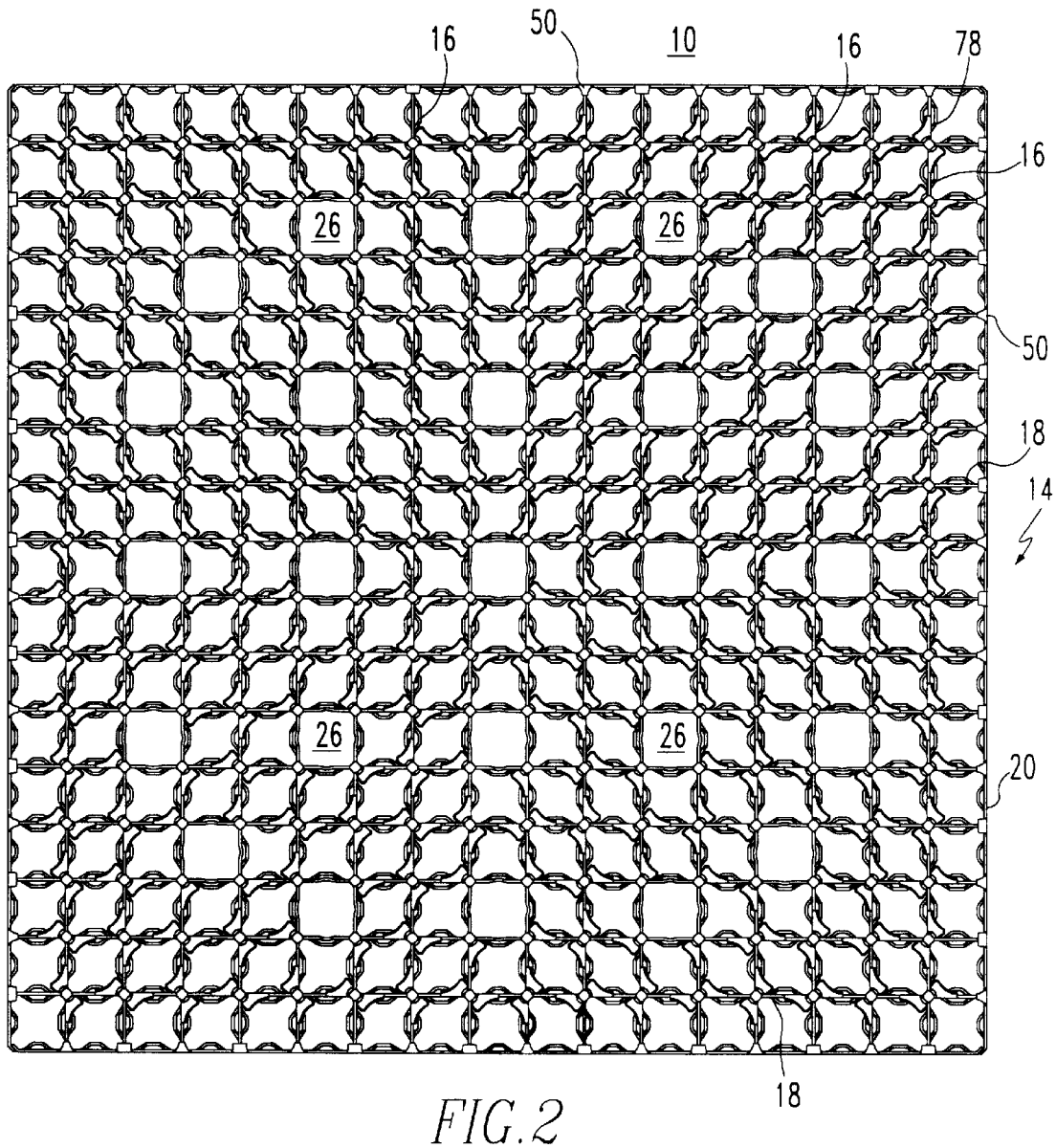
FIG. 2 is a top elevational view of the grid support assembly of this invention showing the general grid pattern confined within the perimeter strap.

FIG. 2 is a top plan view of a fuel assembly support grid 14 formed in the shape of an equilateral, quadrilateral, polygon or square. It should be appreciated, however, that the concepts of this invention can be applied to fuel element support grids employing different shaped perimeters, such as the hexagonal fuel assembly illustrated in the previously referenced U.S. Pat. No. 5,303,276. The grid assembly 14 illustrated in FIG. 2 is constructed from an evenly spaced, parallel array of lattice straps 16, which intersect with a similar, orthogonally positioned, evenly spaced, parallel array of lattice straps 18. The lattice array is welded to a peripheral strap 20 which forms the perimeter of the grid 14. The walls of the straps, intermediate the intersections with the corresponding orthogonal straps, define cells through which the fuel elements 12, guide tubes and instrumentation thimbles 26 pass.

FIG. 2 illustrates a 17 by 17 array of cells, though it should be appreciated that the application of the principles of this invention are not affected by the number of fuel elements 12 in the assembly 10. The lattice straps which form the orthogonal members 16 and 18 shown in FIG. 2, are substantially identical in design and are better illustrated in FIGS. 4 and 5 by reference character 22. While the lattice straps 16 and 18 are substantially identical, it should be appreciated that the design of some of the straps 16 will vary from other lattice straps 16, as well as some straps 18 vary from other straps 18, to accommodate the guide tubes and instrumentation thimble locations 26, as can better be appreciated by reference to FIG. 2, which shows the location of the thimble cells 26.

Figure 4:
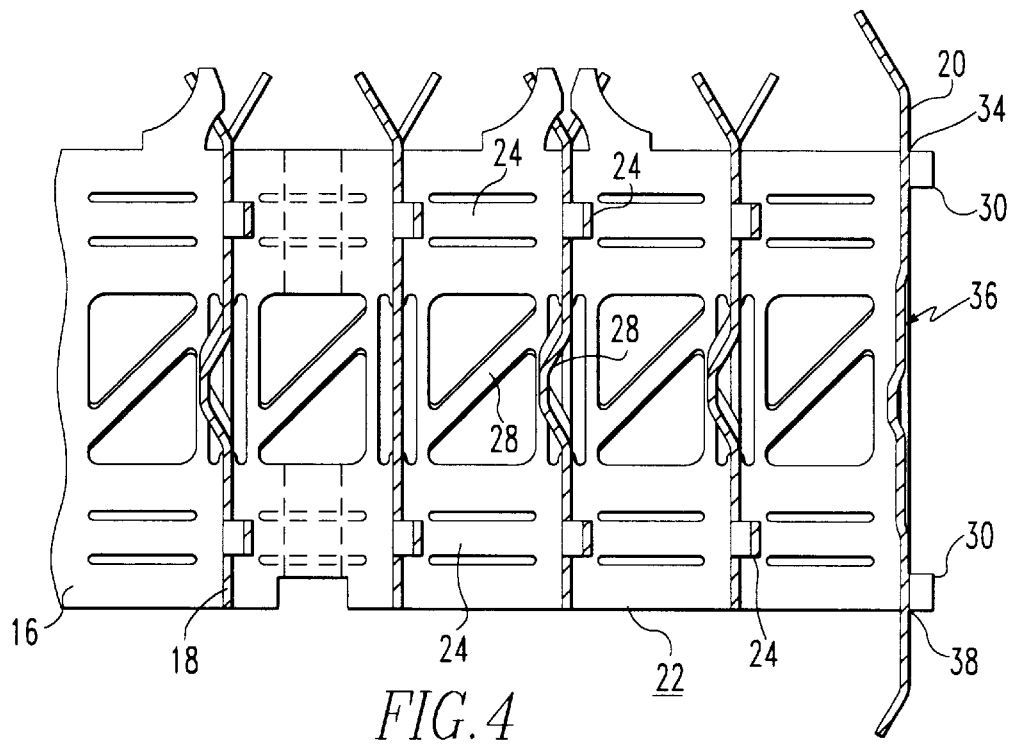
FIG. 4 is a side elevation of one the interior straps of the lattice assembly, mating with a perimeter strap, and attached at peripheral locations along the strap's width with shear welds.
Figure 5:
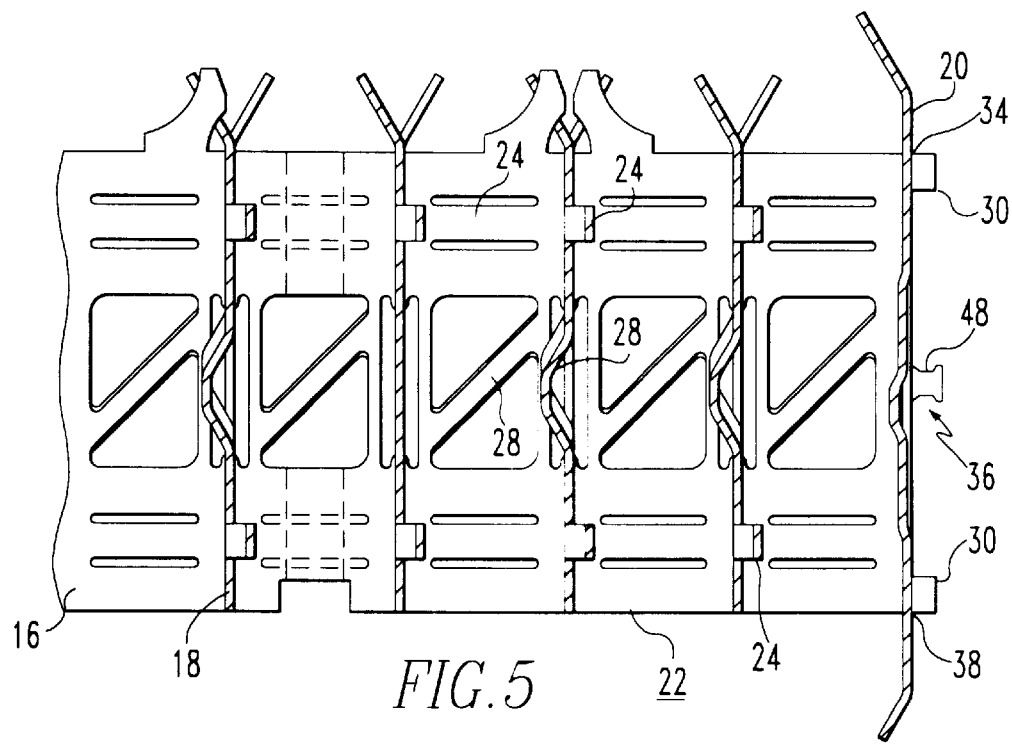
FIG. 5 is a view of FIG. 4 wherein the interior strap is attached to the peripheral strap at its upper, lower and intermediate end locations, along its width, with shear welds.

As previously mentioned, the interior lattice work of conventional designs of grids 14 for nuclear reactor fuel assemblies 10 include a multiplicity of interleaved, inner grid straps 16 and 18 forming an egg-crate configuration defining cells which accept fuel rods 10. The interleaved design is enabled by vertically cut opposing slots in the inner straps 16 and 18 at the intersecting locations, which interlock to form the egg-crate configuration, as is commonly known in the art and better illustrated in FIGS. 4 and 5. The ends of each of the inner grid straps 16 and 18 are connected to the outer grid straps 20 to form the peripheral cells of the grid 14. Most of the individual cells of the grid 14 provide support for one fuel element 12 at a given axial location through the use of a combination of relatively resilient springs 28 and dimples 24 of various forms, one of which is shown in FIGS. 4 and 5. The outer grid strap 20 encloses the inner grid straps to impart strength and rigidity to the grid 14. The improved grid rigidity and strength provided by this invention is accomplished by the means of attachment of the inner grid straps 22 to the peripheral strap 20.

The grids 14 are made of materials with low neutron absorption cross-sections to minimize degradation of the efficiency of the fission process, such as stainless steel, inconel and alloys of zirconium. Grids constructed of zirconium or stainless steel are generally welded at their matrix intersections to achieve structural strength and rigidity. However, inconel grids and bimetallic grids have to be brazed to establish the desired metallurgical bond. This invention is of particular benefit to grids employing the brazing process, in adding to the structural integrity of that bond. The structural integrity of the metallurgical bonds are most severely tested at the interfaces of the interior straps 22 with the peripheral strap 20, due to the contact of the peripheral strap with adjacent fuel assemblies during loading and unloading of the fuel into and out of the core of the nuclear reactor. Applicants have recognized that the joints at the top and bottom of the straps 22 experience the greatest forces due to the loads impacted on the anti-snag tabs 50.

Figure 3:
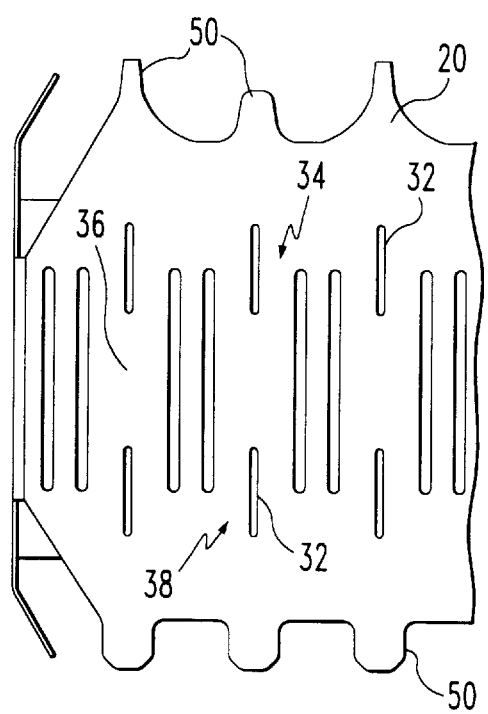
FIG. 3 is a side elevation of the perimeter strap at a corner location.

FIG. 4 shows one structure and method for achieving the desired result wherein the inner straps 22 mate with the outer strap 20 in accordance with this invention. As shown in FIG. 4, the inner strap 22 has tabs 30 formed on its peripheral end, that are designed to mate with corresponding slots 32 in the peripheral strap 20, shown more fully in FIG. 3. The brazing or welding tabs 30 shown in FIG. 4 are provided at an upper region 34 and lower region 38 along the width of the perimeter strap 20. When the tab 30 is welded or brazed, as the case may be, at the slot location (32), it forms a shear joint which is strong in tension to support the rigidity of the inner straps 22. Preferably, the shear joints are formed at the very top and bottom of the inner straps 22 where they mate with the outer strap 20. In addition, a butt weld can be provided to affix the inner straps to the perimeter at the intermediate location 36 along the width of the perimeter strap 20 to further stiffen the strap intersection. While butt welds are not as strong in tension as shear welds, in this configuration the tension load is carried by the metallurgical joints established at the upper and lower locations 34 and 38 along the width of the perimeter strap 20. This arrangement adds substantial strength to brazed joint configurations.

FIG. 5 is a variation of the arrangement shown in FIG. 4 wherein the intermediate straps 22 are supplied at their ends with three welding tabs 30 located respectively at the upper, intermediate and lower locations 34, 36 and 38 along the width of the perimeter strap 20. When welded or brazed, this arrangement provides three shear joints to add tensile strength to the overall grid structure. In addition, for further rigidity, butt joints can be added between the inner straps 22 and the peripheral strap 20 at locations intermediate the upper region 34 and middle region 36 and intermediate the middle region 36 and the lower region 38 along the width of the perimeter strap 20. Thus, affixing the perimeter strap to the interior lattice as provided for by this invention adds to the overall structural integrity and rigidity of the grid structure to more effectively support the fuel elements within the fuel assembly 10.

To improve the constructability of grids 14 manufactured in accordance with this invention, the brazing tabs 30 can be deformed after being inserted in their corresponding slots 32 to hold the peripheral strap 20 in position prior to welding or brazing. A further improvement to facilitate the manufacturing process is illustrated in FIG. 5, which shows an enhancement to the intermediate welding tab 30, illustrated by reference character 48. Thus, one or all of the welding tabs 30 can be designed with a tapered section 48, that is notched into the tab at the location that extends through the corresponding slot 32 in the peripheral strap 20. The narrowed section 48 in the brazing tab 30 assists deformation of the tab to capture the peripheral strap 20 and hold it in position for welding or brazing. One or more of the other tabs 30 can be similarly designed for this purpose.

Accordingly, this invention provides an improved fuel assembly grid structure with added rigidity and strength.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed:

1. A nuclear fuel assembly grid comprising:
   a plurality of intersecting grid straps to form a matrix of fuel element support cells; and
   a perimeter strap that surrounds said matrix and having a width with upper, middle and lower portions along said width, said perimeter strap being affixed along said width to an end of at least one of said grid straps at discrete points at said upper, middle and lower portions with the uppermost and lower most attachments at said portions being formed by shear joints.

2. The nuclear fuel assembly grid of claim 1, wherein said perimeter strap and said grid strap are joined by a shear joint at said upper and lower portions and by a butt joint at said middle portion.

3. The nuclear fuel assembly grid of claim 1, wherein said perimeter strap is joined to said grid strap at said upper, middle and lower portions by shear joints.

4. The nuclear fuel assembly grid of claim 1, wherein said perimeter strap further has an upper intermediate portion between said upper and middle portions, and a lower intermediate portion between said middle and lower portions, and further comprising said perimeter strap being affixed along said width to an end of at least one of said grid straps by shear joints at said upper, middle and lower portions and by butt joints at said upper intermediate and lower intermediate portions.

5. The nuclear fuel assembly grid of claim 1, wherein said shear joint comprises a weld tab formed on the end of at least one of said grid straps which intersects with a corresponding slot formed in said perimeter strap.

6. The nuclear fuel assembly grid of claim 3, wherein said shear joints each comprise a weld tab formed on the end of at least one of said grid straps which intersects with a corresponding slot formed in said perimeter strap.

7. A nuclear fuel assembly grid comprising:
   a plurality of intersecting grids straps to form a matrix of fuel elements formed cells; and
   a perimeter strap that surrounds the matrix and having a width with upper, middle and lower portions along said width, said perimeter strap being affixed along said width to an end of at least one of said grid straps at said upper, middle and lower portions by shear joints comprising a weld tab formed on the end of at least one of said grid straps which intersects with the corresponding slot formed in said perimeter strap with at least one of said weld tabs further comprising a twist tab formed alone an extended portion thereof and deformable so that the tab can be locked in the slot.

8. The nuclear assembly grid of claim 7 wherein the deformed weld tab extends through the middle portion of said perimeter strap.

9. The nuclear fuel assembly grid of claim 1, wherein said grid straps and said perimeter strap are constructed from inconel and said shear joint is a brazed joint.

10. The nuclear fuel assembly grid of claim 1, wherein said grid strap is metallurgically bonded to said perimeter strap at the top and bottom interface of the grid strap with the perimeter strap.

11. The nuclear fuel assembly of claim 10, wherein the top and bottom bonds are brazed.

12. The nuclear assembly grid of claim 7 wherein the twist tab includes a necked down portion.

\* \* \* \* \*